United States Patent [19]

Munakata et al.

[11] Patent Number: 4,771,215
[45] Date of Patent: Sep. 13, 1988

[54] DISPLAY DEVICE WITH A BIOCHEMICAL LUMINOUS REACTION SYSTEM

[75] Inventors: Hirohide Munakata; Satoshi Yuasa, both of Yokohama; Yoko Yoshinaga, Machida; Masahiro Haruta, Tokyo, all of Japan

[73] Assignee: Canon Kabushiki Kaisha, Tokyo, Japan

[21] Appl. No.: 890,410

[22] Filed: Jul. 29, 1986

[30] Foreign Application Priority Data

Aug. 9, 1985 [JP] Japan .................................. 60-174207

[51] Int. Cl.$^4$ ............................................. H01J 61/38
[52] U.S. Cl. ..................................... 313/483; 313/358
[58] Field of Search ................................. 313/483, 358

[56] References Cited

U.S. PATENT DOCUMENTS 3,213,440 10/1965 Gesteland et al. .............. 313/483 X

OTHER PUBLICATIONS

Slawinska et al., "Biological Chemiluminescence", *Photochemistry and Photobiology*, 37, pp. 709–713 (1983).

*Primary Examiner*—Palmer C. DeMeo
*Attorney, Agent, or Firm*—Fitzpatrick, Cella, Harper & Scinto

[57] ABSTRACT

A display device is provided which comprises a medium includng a biochemical luminous reaction system and an electrode which controls electrochemically the concentration of at least one of reactants participating in said reaction system in a cell. The luminous reaction system may include an enzyme, and the electrode may be modified with a polymer.

26 Claims, 1 Drawing Sheet

DISPLAY DEVICE WITH A BIOCHEMICAL LUMINOUS REACTION SYSTEM

BACKGROUND OF THE INVENTION

1. Field of the Invention

This invention relates to a display device comprising a light-emitting display portion which utilizes biochemical luminous reaction in which enzymes or the like participate and perform switching by controlling electrochemically said luminous reaction.

2. Related Background Art

Heretofore, as artificial display devices utilizing electrical energy, there have been known, for example, those having a light-emitting display portion comprising a luminescent layer containing a material having the EL (electroluminescence) function such as ZnS, etc., between a pair of electrodes or those using LED (light emitting diode) for the light-emitting display portion.

In contrast with such artificial light-emitting systems, the system of bioluminescence as seen in bacteria or glowfly takes out the difference in chemical potential directly as light energy and converts chemical energy directly to light energy, and thus bioluminescence is known to exhibit extremely high luminescence quantum efficiency, for example, 0.88 in the case of luminescence quantum efficiency of a glowfly, without wasting effective energy in a form of heat, etc.

As a report describing generally a bioluminescence system as mentioned above, "Photochemistry and Photobiology, Vol. 37, No. 6, pp. 709–715, 1983" is mentioned for the purpose of reference.

Thus, various functions performed in a living body surpass functions of artificial systems in many cases, and this is considered to result largely from the characteristics of biochemical reactions such as extremely high conversion of various chemical reactions or very high specificity of the reaction in living bodies.

Accordingly, bioreactors or biosensors are attracting attention and comprehensively studied, and these devices will soon be commercialized in consequence of development of immobilization techniques for enzymes or microorganisms.

However, under the present situation, for practical utilization of various instruments utilizing biological reactions as mentioned above, the method of controlling and switching biochemical reaction has not yet been completely established. Particularly, in a device utilizing a bioluminous reaction, no suitable method has been known yet for controlling and switching biochemical reaction concerning luminescence.

SUMMARY OF THE INVENTION

An object of the present invention is to provide an electrically driven display device having a light-emitting display portion utilizing bioluminous reaction with high luminescence quantum efficiency.

Another object of the present invention is to provide a display device having satisfactory switching and control mechanism of luminescence intensity of biochemical luminous reaction according to the electrochemical method.

The above objects can be accomplished by the present invention as described below.

The present invention provides a display device comprising a medium including a biochemical luminous reaction system and an electrode which controls electrochemically the concentration of at least one of the reactants participating in said reaction system in a cell.

Also, the present invention provides a display device, comprising a medium including a luminous reaction system in which an enzyme participates and a polymer-modified electrode which controls electrochemically the concentration of at least one of the reactants participating in said reaction system in a cell.

DESCRIPTION OF THE PREFERRED EMBODIMENTS

Figure 1:
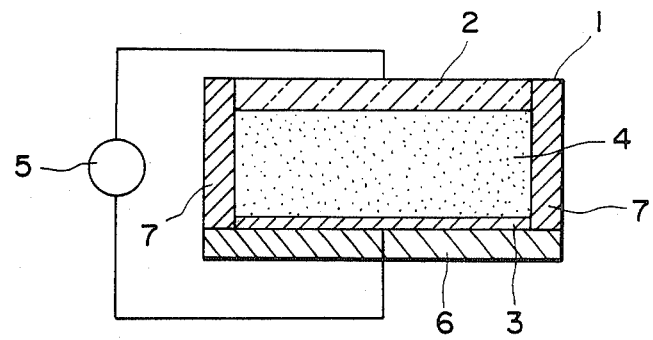
FIG. 1 and FIG. 3 are each longitudinal cross sectional view of a constitutional example of the light-emitting display portion of the display device of the present invention.

Referring to the drawings, the display device of the present invention is described in detail.

FIG. 1 shows an example of the constitution of the light-emitting display portion of the display device of the present invention, in which 1 is a cell for forming the light-emitting portion for performing the luminous reaction therein, said cell being provided with a counter-electrode 2 comprising a transparent electrode for taking out light provided at the cover portion and a working electrode 3, and these electrodes are connected to each other through a DC power source 5.

The shape of the cell 1 is made so as to enable a desired display. For example, when the cell itself gives a desired display, the shape of the cell as viewed from the side from which light is taken out (upper side) may be formed to become a desired display shape. On the other hand, when the display device is constituted to enable a desired display by arranging a plurality of cells in a matrix and controlling the luminescent state of respective cells, a shape suitable therefor may be formed. Further, electrodes 2 and 3 can be disposed suitably depending on the constitution of the desired display device. For example, in place of providing them at the cover portion or the bottom portion of the cell, they can be provided on the side walls. Alternatively, while the electrodes of the cells in this example serve also as the top cover portion and bottom portion of the cell, of course they can be provided independently of the construction of the cell 1.

As the material constituting the cell 1, any material may be available, so long as desired mechanical strength can be obtained, and it can be suitably selected in view of workability, economy and as well as ease of handling. For example, it can be constituted of a material such as glass, ceramics, metal, polymer, etc.

The cell 1 is internally filled with a reaction medium 4 containing the components of the reactive components participating in luminous reaction, excluding the component which is doped (incorporated) into the working electrode 3 depending on the potential applied on said electrode, or released from said electrode, thus forming a light-emitting portion where a luminous reaction is carried out in which an enzyme, etc., participates.

As the reaction medium 4 to be used for formation of the light-emitting portion, there may be used a substance which has electroconductivity at the state where an enzyme participating in the luminous reaction and the reactants such as substrate, etc. are dissolved or dispersed, or at the state where electrolytes such as NaClO$_4$ etc. are further added, namely a medium which may become an electrolytic solution. A typical preferable example of such a medium is water.

When an enzyme is contained in the reaction medium 4, it is preferable to further add an enzyme stabilizer such as albumin, polyethyleneimine, etc.

The counter-electrode 2 can be formed by use of a conventional material for construction of electrode, but it is preferably formed of an electrochemically inert material which does not react with the reaction medium 4 and the substances contained in said reaction medium. Such materials for construction of electrode may include, for example, platinum, gold, indium tin oxide (I.T.O.), graphite, black carbon, etc.

The working electrode 3 has the function of being doped (incorporating) with at least one of the reactants participating in the luminous reaction which can exist as charged molecules in the reaction medium 4 from the reaction medium 4 into the inner portion thereof releasing the reactant from the inner portion thereof into the reaction medium 4. As such an working electrode 3, there may be preferably employed, for example, an electrode comprising a metal oxide such as In$_2$O$_3$, I.T.O., etc., or a polymer-modified electrode in which at least the surface contacting with the reaction medium 4 of a conductor made of platinum, gold, silver, copper, or Nesa glass is modified with a polymer film formed by electrolytic polymerization of polypyrrole, polythienylene, polyacetylene, poly-p-phenylene, poly-m-phenylene sulfide, polyindole, polyfuran, etc.

In the present invention, the polymer film is generally formed to have a thickness within the range of from 1 μm to 100 μm, more preferably from 1 μm to 50 μm.

Figures 2, 3:
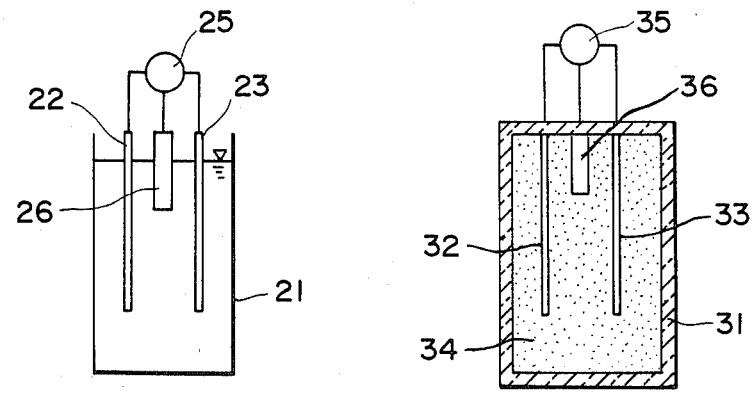
FIG. 2 is a schematic illustration of the device to be used for formation and control of the polymer-modified electrode to be used in the present invention.

The polymer-modified electrode can be formed by adding an appropriate amount of a monomer for formation of electrolytically polymerized film such as acetylene, pyrrole, thiophene, furan, aniline, etc., into a solution of an electrolyte such as C$_2$H$_5$)$_4$NClO$_4$, (CH$_3$)$_4$NPF$_6$, etc., dissolved in a solvent such as acetonitrile, tetrahydrofuran, benzonitrile, water, etc., then disposing an electrode 23 comprising the material capable of constituting the working electrode as described above, further a counter electrode 22 and a reference electrode 26 in this solution as shown in FIG. 2, and carrying out controlled potential oxidation by applying a constant potential on the working electrode 23 under this state to carry out electrolytic polymerization of the above monomer on the surface of the electrode 23 for formation of the working electrode, thereby modifying said electrode surface with the polymer film.

Thus, the present invention is greatly characterized in that biochemical luminous reaction is electrochemically controlled or switched by applying a predetermined potential on the electrode having the function as described above provided in contact with an electrolyte solution, while utilizing doping of the component comprising charged molecules existing in said electrolytes solution into said electrode or releasing said component from within said electrode.

In the present invention, the potential to be applied on the electrode as described above is generally 0.1 V to 10 V, more practically from 0.1 V to 3 V.

Accordingly, when the luminous reaction to be carried out in the cell 1 is a reaction in which a nucleotide compound represented by the following formula (I) participates:

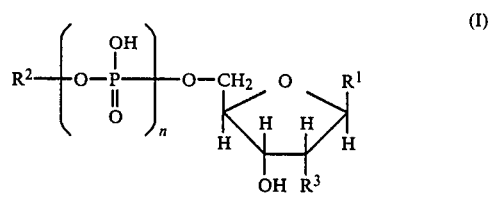

(wherein R$^1$ represents a heterocyclic base selected from adenine, guanine, cytosine, uracil and thymine, R$^2$ represents hydrogen, nicotinamide nucleotide or its reduced derivative or riboflavin or its reduced derivative, R$^3$ represents —OH, —H or

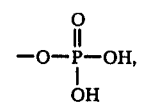

and N represents an integer of 1 to 3), these compounds can exist as charged molecule in an electrolyte solution, and doping into and releasing from the working electrode of these compounds can be effectively performed. Therefore, these compounds are preferable as the component to be doped into the working electrode.

In selection of a component to be doped into the working electrode, it is necessary to select a component which can be doped into and released from the working electrode under chemically stable state.

The light-emitting display portion of the display device of the present invention with such a constitution can be controlled and operated as described below to emit light.

First, the working electrode is placed together with a counter-electrode 22 comprising platinum, etc., and a reference electrode 26 comprising Ag/AgCl, etc., in an electrolyte solution prepared by dissolving a predetermined amount of, for example (C$_2$H$_5$)$_4$NClO$_4$ in an electrolytic cell 21 as shown in FIG. 2, and releasing of a doped substance from the acting electrode 23 is conducted by application of a predetermined potential on the working electrode 23. Next, an electrolyte solution containing at least one of the luminous reactants as charged molecules is placed in the electrolytic cell 21, and the working electrode 23 having been subjected to the dopant releasing treatment is placed again together with the counter-electrode 22 and the reference electrode 26 and the working electrode 23 is previously doped with at least one kind of the reactants which participate in the luminous reaction contained in the electrolyte solution and arranged in the cell 1.

In the releasing or doping of the reactants as described above, the potential to be applied on the working electrode may be selected appropriately depending on the constituent material of the working electrode employed, electrochemical characteristics of the component to be doped into the working electrode, etc.

As the next step, in the reaction medium 4 for forming the luminous portion in the cell 1, other components participating in the luminous reaction than the component doped into the working electrode 3 as described above are dissolved or dispersed, followed further optionally by addition of a predetermined amount of an electrolyte, and the resulting solution is filled as the electrolyte solution in the cell 1.

When a predetermined potential is applied on the working electrode 3 by the power source 5 under this state, the reactant previously doped into the working electrode 3 is released into the reaction medium 4, whereby the reaction of the respective components participating in the luminous reaction is commenced in the reaction medium 4 to effect luminescence of the inner portion of the cell. Further, by varying the potential applied on the electrode 3, luminescence intensity can be controlled. Also, if a potential of the opposite polarity to that used in releasing is applied on the working electrode 3, the reactant in the reaction medium 4 which is previously doped into the working electrode and released into said reaction medium becomes doped again into the working electrode 3 to be reduced in its concentration in the reaction medium 4, until luminescence is terminated when there is no more said component in the reaction medium 4.

As the reaction system for carrying out luminous reaction within the display device of the present invention, there may be preferably used a reaction system comprising a reduced derivative of luciferase, flavin mononucleotide (FMN), nicotinamide adenine dinucleotide (NAD) which are known as the component participating in biological luminous reaction in bacteria such as *Photobacterium phosphoreum*, for example, an aldehyde having a straight chain with 8 or more carbon atoms such as octylaldehyde, decylaldehyde, stearylaldehyde, etc., and oxygen.

The present invention is described in more detail by referring to the following Reference examples and Examples.

REFERENCE EXAMPLE 1

A polymer-modified electrode was prepared by modifying a platinum electrode according to the method as described below and the resulting electrode was used for construction of the display device of the present invention.

First, in an electrolytic cell 21 made of a glass as shown in FIG. 2, an acetonitrile solution containing 0.1M $(C_2H_5)_4$ and 0.7M thiophene was prepared and further a working electrode 23 made of platinum, a counter-electrode 22 and a reference electrode 26 made of Ag/AgCl were placed therein and these electrodes were connected to the terminals of a potentionstat 25, respectively.

Here, controlled potential oxidation was carried out by applying a potential of 1.8 V on the working electrode 23 (relative to the Ag/AgCl electrode 26) for 180 minutes to form a polythienylene electrolytically polymerized film (film thickness 50 μm) on the surface of the working electrode 23. Thus, a polymer-modified electrode was obtained.

REFERENCED EXAMPLE 2

An electrode was formed by vapor deposition of gold to a desired pattern on a copper substrate and, by use of this electrode, a polymer-modified electrode was prepared according to the method as described below. Further, the electrode formed was used for construction of the display device of the present invention.

First, in an electrolytic cell 21 made of a glass as shown in FIG. 2, an acetonitrile solution containing 0.1M $(C_2H_5)_4NClO_4$ and 1.0 M pyrrole was prepared and further the electrode 23 having gold vapor deposited on the copper substrate surface as the working electrode, a platinum electrode 22 as the counter-electrode and Ag/AgCl electrode 24 as the reference electrode were placed therein, and these electrodes were connected to the terminals of a potentionstat 25, respectively.

Here, controlled potential oxidation was carried out for 300 minutes by applying a potential of 1.0 V on the working electrode 23 (relative to Ag/AgCl electrode 26) to form a polypyrrole electrolytically polymerized film (film thickness 10 μm) on the vapor deposited surface of gold of the working electrode 23. Thus, a polymer-modified electrode was obtained.

EXAMPLE 1

By use of the polymer-modified electrode formed in Reference example 1, a light-emitting display portion of the display device of the present invention was prepared as described below.

First, after the polymer-modified electrode obtained in Reference example 1 was washed, it was disposed together with the counter-electrode 22 made of platinum and the reference electrode 26 made of Ag/AgCl in acetonitrile containing 0.1M $(C_2H_5)_4NClO_4$ in an electrolytic cell 21 as shown in FIG. 2, and these electrodes were connected to the predetermined terminals of the potentionstat 25.

Then, dopant-releasing treatment of the polythienylene film modifying said electrode surface was carried out by applying a potential of 0 V on the polymer-modified electrode 23 (relative to Ag/AgCl electrode 26 for 240 minutes.

Next, after the electrolyte in the electrolytic cells 21 made of glass was replaced with a 0.1M Tris-HCl buffer (ph=8.0) containing 0.1M FMN and 0.05M of $(C_2H_5)_4NClO_4$, the polymer-modified electrode having been treated for dopant-release was disposed again together with the counter-electrode 22 made of platinum and the reference electrode 26 made of Ag/AgCl in this solution, and further these electrodes were connected to the predetermined terminals of the potentionstat 25. Then, FMN was doped into the polymer-modified electrode 23 by applying a potential of 0.3 V on the polymer-modified electrode 23 (relative to the AG/AgCl electrode 26) for 120 minutes.

As the next step, in a cell 31 made of a glass constituting the light-emitting display portion of the display device as shown in FIG. 3, first an oxygen-saturated reaction solution 34 prepared by bubbling oxygen into an aqueous solution containing 0.5M NADH, 1 mg/ml of luciferase, 10 mM of n-decylaldehyde and 0.05M of $(C_2H_5)_4NClO_4$, and further the polymer-modified electrode 33 doped with FMN as described above was disposed together with the counter-electrode 32 made of platinum and the reference electrode 36 made of Ag/AgCl therein. These electrodes were connected to the predetermined terminals of the potentiostat 35, respectively, to form the light-emitting display portion of the display device of the present invention.

In the light-emitting display portion thus formed, when a potential of −10 V (relative to the Ag/AgCl electrode 36) was applied on the polymer-modified electrode 33, FMN previously doped into the polymer-modified electrode 33 was released into the solution 34 for reaction in the cell, whereby the respective components reacted with each other to cause green light-emission of the whole cell.

When a potential of 0.03 V (relative to Ag/AgCl electrode 36) was applied on the polymer-modified electrode 33 under such a state, FMN became incorporated again into the polymer-modified electrode 33 from the solution for reaction 34 in the cell, whereby the luminescence intensity in the cell decreased gradually, until finally luminescence was terminated when there was no FMN in the reaction solution.

EXAMPLE 2

By use of the polymer-modified electrode formed in Reference Example 2, the light-emitting display portion of the display device of the present invention was formed as described below.

First, the polymer-modified electrode obtained in Reference Example 2 was subjected to the dopant-releasing treatment in the same manner as Example 1, and further FMN was doped into the polymer-modified electrode in the same manner as Example 1 except for making the potential applied on the polymer-modified electrode 0.0 V.

Next, as shown in FIG. 1, at the portion of the copper substrate where no polymer-modified electrode 3 is formed, a partioning plate 7 made of an acrylic resin was bonded vertically with an epoxy resin so that the polymer-modified electrode 3 may be positioned within the cell, followed further by bonding of an I.T.O. electrode plate functioning as the counter-electrode as well as a cover was bonded thereto to form a cell 1.

As the next step, the cell 1 was filled with a reaction solution 4 (12 ml) prepared by bubbling of oxygen to saturation into a 0.5M Tris-HCl buffer (pH=7.0) containing 0.5M NADH, 1 mg/ml of luciferase, 10 mM n-decylaldehyde and 0.05M $(C_2H_5)_4NClO_4$ to obtain the light-emitting display portion of the display device of the present invention.

In the light-emitting display portion thus formed, when a potential of $-0.4$ V[relative to Ag/AgCl electrode (not shown)] was applied on the polymer-modified electrode, FMN previously doped into the polymer-modified electrode 3 was released into the reaction solution 4 in the cell, whereby the respective components reacted with each other to cause green light emission of the whole cell.

When a potential of 0.3 V [relative to Ag/AgCl electrode (not shown)] was applied on the polymer-modified electrode 3, FMN became incorporated again into the polymer-modified electrode 3 from the reaction solution 4 in the cell 1, whereby the luminescence intensity of the cell 1 decreased gradually, until finally luminescence ceased when there was no FMN in the reaction solution 4.

As described above, the display device of the present invention utilizes the biochemical reaction which can convert the supplied energy to light with sufficiently high efficiency, namely luminescence by the enzyme reaction. According to the present invention, it has been rendered possible to provide a display device having a light-emitting display portion with high luminescence quantum efficiency.

Further, according to the present invention, it has been rendered possible to provide good switching of biochemical luminous reaction and the method for controlling luminescence intensity by the electrochemical method, namely electrical signals.

What is claimed is:

1. A display device comprising a cell containing a reaction medium for a biochemcial luminous reaction system involving at least two reactants, an electrode in contact with said reaction medium, a counter-electrode spaced from said electrode an in contact with said reaction medium, means for applying a potential across said electrodes, and at least two reactants; said reactants individually being in the reaction medium or releasably incorporated in said electrode; said electrode being capable of electrochemically controlling the concentration of at least one reactant in said reaction medium by reversibly releasing said at least one reactant in response to an applied potential.

2. A display device according to claim 1, wherein said medium is water containing an enzyme.

3. A display device according to claim 1, wherein said medium is an electrolyte containing an enzyme.

4. A display device according to claim 1, wherein said electrode comprises a metal oxide.

5. A display device according to claim 1, wherein said electrode comprises a conductor modified with a polymer film on its surface.

6. A display device according to claim 5, wherein said polymer is selected from the group consisting of polypyrrole, polythienylene, polyacetylene, poly-p-phenylene, poly-m-phenylene sulfide, polyindole and polyfuran.

7. A display device according to claim 5, wherein said polymer film has a thickness within the range of from 1 $\mu$m to 100 $\mu$m.

8. A display device according to claim 1, wherein said luminous reaction is a reaction in which a nucleotide compound having the formula shown below participates:

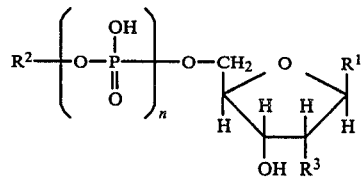

(wherein $R^1$ represents a heterocyclic base selected from adenine, guanine, cytosine, uracil and thymine, $R^2$ represents hydrogen, nicotinamide nucleotide or its reduced derivative, or riboflavin or its reduced derivative, $R^3$ represents —OH, —H or

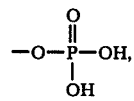

and n represents an integer of 1 to 3), said nucleotide compound being doped into said electrode or released from within said electrode.

9. A display device according to claim 1, wherein said reaction medium comprises a catalyst.

10. A display device according to claim 1, wherein said at least two reactants are flavin monomucleotde (FMN) and luciferase.

11. A display device according to claim 1, wherein said reaction medium comprises a reduced form of nicotinamide adenine dinucleotide (NAD).

12. A display device according to claim 1, wherein sadi reaction medium comprises an aldehyde.

13. A display device according to claim 1, wherein said reaction medium is a solution saturated with oxygen prepared by bubbling oxygen thereinto.

14. A display device according to claim 1, wherein said reaction medium comprises luciferase, flavin mononucleotide, a reduced form of nicotinamide adenine dinucleotide, an aldehyde, and oxygen.

15. A display device comprising a cell containing a reaction medium for a biochemical luminous reaction system involving an enzyme and at least one other reactant, an enzyme in said reaction medium, a polymer-modified electrode in contact with said reaction medium, a counter-electrode spaced from said electrode an in contact with said reaction medium, means for applying a potential across said electrodes, and at least one reactant; said reactant being in the reaction medium or releaseably incorporated in said polymer-modified electrode; said polymer-modified electrode being capable of electrochemically controlling the concentration of said reactant in said reaction medium by reversibly releasing said reactant in response to an applied potential.

16. A display device according to claim 15, wherein said medium is water containing an enzyme.

17. A display device according to claim 15, wherein said medium is an electrolyte containing an enzyme.

18. A display device according to claim 15, wherein said polymer is selected from the group consisting of polypyrrole, polythienylene, polyacetylene, poly-p-phenylene, poly-m-phenylene sulfide, polyindole and polyfuran.

19. A display device according to claim 15, wherein said polymer film has a thickness within the range of from 1 μm to 100 μm.

20. A display device according to claim 15, wherein said luminescent reaction is a reaction in which a nucleotide compound having the formula shown below participates:

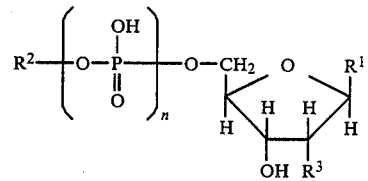

(wherein $R^1$ represents a heterocyclic base selected from adenine, guanine, cytosine, uracil and thymine, $R^2$ represents hydrogen, nicotinamide nucleotide or its reduced derivative, or riboflavin or its reduced derivative, $R^3$ represents —OH, —H or

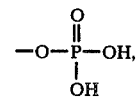

and n represents an integer of 1 to 3), said nucleotide compound being doped into said electrodes or released from within said electrodes.

21. A display device according to claim 15, wherein said reaction medium comprises a catalyst.

22. A display device according to claim 15, wherein said at least two reactants are flavin monomucleotide (FMN) and luciferase.

23. A display device according to claim 15, wherein said reaction medium comprises a reduced form of nicotinamide adenine dinucleotide (NAD).

24. A display device according to claim 15, wherein said reaction medium comprises an aldehyde.

25. A display device according to claim 15, wherein said reaction medium is a solution saturated with oxygen prepared by bubbling oxygen thereinto.

26. A display device according to claim 15, wherein said reaction medium comprises luciferase, flavin mononucleotide, a reduced form of nicotinamide adenine dinucleotide, an aldehyde, and oxygen.

* * * * *